US009354537B2

(12) United States Patent
Ueda et al.

(10) Patent No.: US 9,354,537 B2
(45) Date of Patent: May 31, 2016

(54) IMAGE FORMING APPARATUS FOR CALCULATING SHAPE OF RECORDING MEDIUM BASED ON ANGLES BETWEEN CONVEYING DIRECTION AND STRAIGHT LINES USING UPSTREAM AND DOWNSTREAM DETECTORS

(71) Applicants: Naoto Ueda, Ibaraki (JP); Makoto Nakura, Ibaraki (JP); Shingo Takai, Ibaraki (JP); Satoshi Ueda, Ibaraki (JP); Koichi Kudo, Kanagawa (JP)

(72) Inventors: Naoto Ueda, Ibaraki (JP); Makoto Nakura, Ibaraki (JP); Shingo Takai, Ibaraki (JP); Satoshi Ueda, Ibaraki (JP); Koichi Kudo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 7 days.

(21) Appl. No.: 13/951,007

(22) Filed: Jul. 25, 2013

(65) Prior Publication Data

US 2014/0029961 A1 Jan. 30, 2014

(30) Foreign Application Priority Data

Jul. 30, 2012 (JP) ................................ 2012-168504

(51) Int. Cl.

*G06K 15/16* (2006.01)
*G03G 15/01* (2006.01)
*G03G 15/00* (2006.01)

(52) U.S. Cl.

CPC ........ *G03G 15/0131* (2013.01); *G03G 15/0189* (2013.01); *G03G 15/6567* (2013.01)

(58) Field of Classification Search

CPC .......... G03G 2215/00721; G03G 2215/00734; H04N 1/00748

See application file for complete search history.

(56) References Cited

U.S. PATENT DOCUMENTS

| | | | | |
|---|---|---|---|---|
| 8,430,583 | B2 | 4/2013 | Suzuki | |
| 8,452,196 | B2 | 5/2013 | Kazama et al. | |
| 2006/0112845 | A1* | 6/2006 | Ouchi | 101/467 |
| 2008/0019724 | A1* | 1/2008 | Yamagata | 399/72 |
| 2008/0054547 | A1* | 3/2008 | Oki | 271/12 |
| 2010/0207322 | A1* | 8/2010 | Yasumoto | 271/228 |
| 2010/0238516 | A1* | 9/2010 | Ito | 358/448 |
| 2012/0057210 | A1* | 3/2012 | Tsukahara et al. | 358/461 |
| 2013/0083367 | A1* | 4/2013 | Hara | 358/449 |

FOREIGN PATENT DOCUMENTS

| | | |
|---|---|---|
| JP | 2004-064288 | 2/2004 |
| JP | 2004-271739 | 9/2004 |
| JP | 2006-078927 | 3/2006 |
| JP | 2006-171512 | 6/2006 |
| JP | 2007-102090 | 4/2007 |
| JP | 2007-169027 | 7/2007 |

(Continued)

*Primary Examiner* — Benny Q Tieu
*Assistant Examiner* — Haris Sabah
(74) *Attorney, Agent, or Firm* — IPUSA, PLLC

(57) ABSTRACT

An image forming apparatus includes an image forming unit that forms an image on a recording medium; a width detector that detects positions of side edges of the recording medium in a width direction, which is orthogonal to a conveying direction in which the recording medium is conveyed, at multiple detection positions along the conveying direction; a shape calculator that calculates angles between the conveying direction and straight lines each connecting the positions of the same side edge detected at the multiple detection positions and calculates a shape of the recording medium based on the angles; and a correction unit that corrects image data of the image to be formed by the image forming unit based on the calculated shape of the recording medium.

7 Claims, 11 Drawing Sheets

(56) References Cited

FOREIGN PATENT DOCUMENTS

| | | |
|---|---|---|
| JP | 2009-053287 | 3/2009 |
| JP | 2010-179992 | 8/2010 |
| JP | 4525270 | 8/2010 |
| JP | 2010-201869 | 9/2010 |
| JP | 2011-043533 | 3/2011 |
| JP | 2011-063332 | 3/2011 |
| JP | 2011-079190 | 4/2011 |
| JP | 2011-085474 | 4/2011 |
| JP | 2012-071575 | 4/2012 |

* cited by examiner

IMAGE FORMING APPARATUS FOR CALCULATING SHAPE OF RECORDING MEDIUM BASED ON ANGLES BETWEEN CONVEYING DIRECTION AND STRAIGHT LINES USING UPSTREAM AND DOWNSTREAM DETECTORS

CROSS-REFERENCE TO RELATED APPLICATION

The present application is based upon and claims the benefit of priority of Japanese Patent Application No. 2012-168504, filed on Jul. 30, 2012, the entire contents of which are incorporated herein by reference.

BACKGROUND OF THE INVENTION

1. Field of the Invention

An aspect of this disclosure relates to an image forming apparatus.

2. Description of the Related Art

In the commercial printing industry, for small-lot printing of various types of data and variable data printing, a Print On Demand (POD) system including an electrophotographic image forming apparatus has become more popularly used than an offset press. An electrophotographic image forming apparatus used for such a purpose needs to provide accurate registration or register (the correspondence of the position of printed matter on the two sides of a sheet) and image uniformity that are comparable to those of an offset press.

Causes of misregisteration or misregister (i.e., inaccurate registration) in an image forming apparatus include registration error in the vertical or horizontal direction, skew error between a recording medium and a printed image, and change in image length caused when a toner image is transferred. Also, in an image forming apparatus including a fusing unit, misregistration may occur due to an image magnification error that is caused when a recording medium heated by the fusing unit expands or contracts.

In a related-art technology for preventing misregistration, after an image is printed on a front surface of a paper sheet (an example of a recording medium), dimensions of the paper sheet in the main-scanning and sub-scanning directions are detected at given positions on the paper sheet, and the magnification of an image to be printed on a back surface of the paper sheet is corrected based on changes in the size of the paper sheet that are determined based on the detected dimensions of the paper sheet (see, for example, Japanese Laid-Open Patent Publication No. 2004-271739 and Japanese Laid-Open Patent Publication No. 2007-102090).

Here, when a paper sheet is heated and pressed by a fusing unit to print an image on the front surface, the shape of the paper sheet unevenly changes, for example, from a rectangle to a trapezoid. That is, a paper sheet is deformed unevenly in the main-scanning direction and the sub-scanning direction. However, with the related-art technology where changes in the size of a paper sheet are determined based on the dimensions of the paper sheet in the main-scanning direction and the sub-scanning direction, each of which is detected at one position on the paper sheet, it is not possible to detect changes in the size of the paper sheet at other positions and therefore it is difficult to accurately determine the shape of a deformed paper sheet.

SUMMARY OF THE INVENTION

In an aspect of this disclosure, there is provided an image forming apparatus including an image forming unit that forms an image on a recording medium; a width detector that detects positions of side edges of the recording medium in a width direction, which is orthogonal to a conveying direction in which the recording medium is conveyed, at multiple detection positions along the conveying direction; a shape calculator that calculates angles between the conveying direction and straight lines each connecting the positions of the same side edge detected at the multiple detection positions and calculates a shape of the recording medium based on the angles; and a correction unit that corrects image data of the image to be formed by the image forming unit based on the calculated shape of the recording medium.

DESCRIPTION OF THE PREFERRED EMBODIMENTS

Preferred embodiments of the present invention are described below with reference to the accompanying drawings. Throughout the accompanying drawings, the same reference numbers are used for the same components, and overlapping descriptions of those components may be omitted.

First Embodiment

Configuration of Image Forming Apparatus

Figure 1:
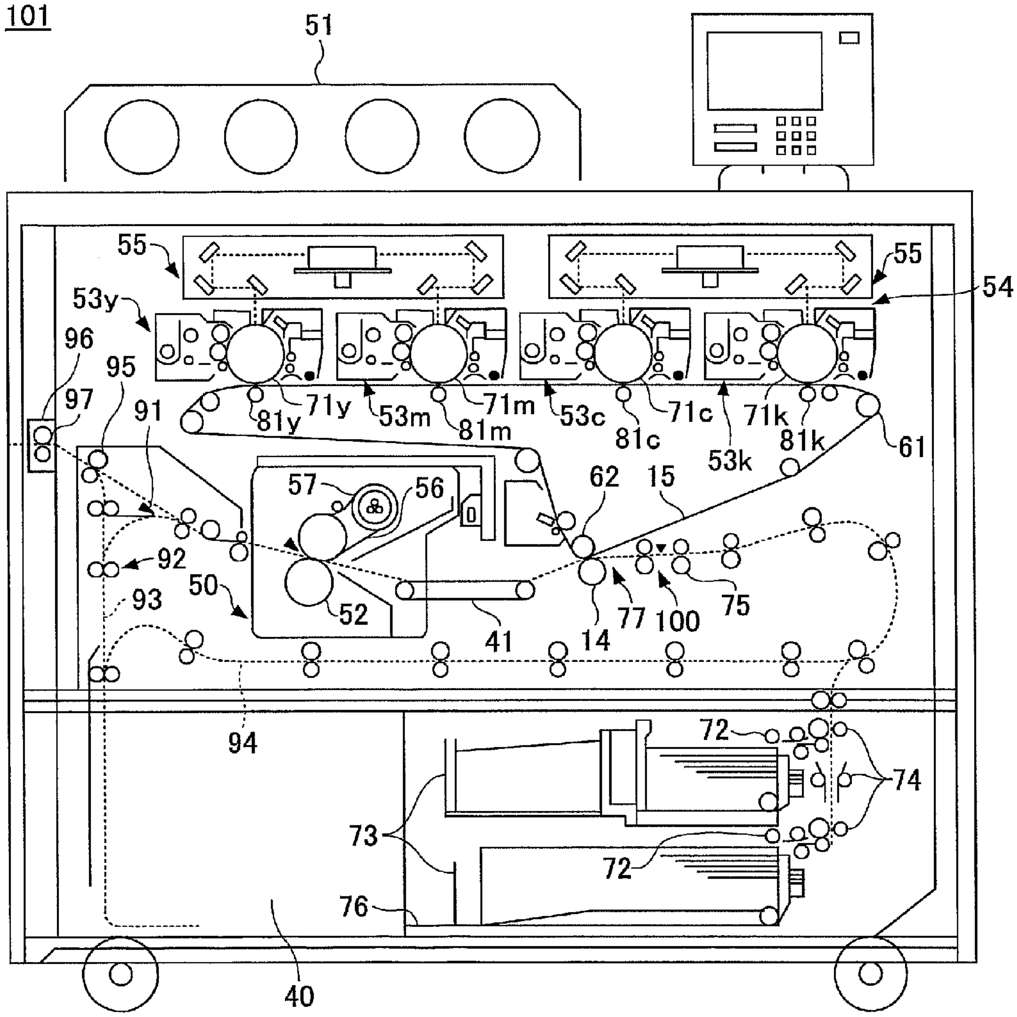
FIG. 1 is a schematic diagram illustrating an exemplary configuration of an image forming apparatus according to a first embodiment.

FIG. 1 is a schematic diagram illustrating an exemplary configuration of an image forming apparatus 101 according to a first embodiment.

The image forming apparatus 101 includes a tandem image forming unit 54, an intermediate transfer belt 15, and a secondary transfer unit 77 that constitute an image forming unit. The secondary transfer unit 77 alone may also be referred to as an image forming unit. The image forming unit forms an image on a sheet S that is a recording medium such as paper or an overhead projector (OHP) sheet.

The intermediate transfer belt 15 is disposed in approximately the center of the image forming apparatus 101 and is stretched over multiple rollers so as to be able to rotate clockwise in FIG. 1. The intermediate transfer belt 15 is rotated by the rotation of a roller 61.

The tandem image forming unit 54 includes multiple developing units 53 that are arranged along the conveying direction of the intermediate transfer belt 15. An exposing unit 55 is provided above the tandem image forming unit 54. Each of the developing units 53 of the tandem image forming unit 54 includes a photosensitive drum 71 that functions as an image carrier for carrying a toner image of the corresponding color.

Primary transfer rollers 81 are provided to face the corresponding photosensitive drums 71 across the intermediate transfer belt 15, i.e., at primary transfer positions where toner images are transferred from the photosensitive drums 71 to the intermediate transfer belt 15.

A secondary transfer unit 77 is provided opposite to the tandem image forming unit 54 across the intermediate transfer belt 15 (i.e., downstream of the tandem image forming unit 54 in the conveying direction of the intermediate transfer belt 15). The secondary transfer unit 77 includes a secondary transfer roller 14 to which a transfer electric field is applied and a roller 62 facing the secondary transfer roller 14. The secondary transfer roller 14 is pressed against the roller 62 while applying a transfer electric field to transfer an image from the intermediate transfer belt 15 to the sheet S. The secondary transfer unit 77 changes a transfer current, which is a transfer condition parameter and to be applied to the secondary transfer roller 14, according to the type of sheet S.

The image forming apparatus 101 also includes a sheet conveying unit 100 that detects the length in a conveying direction of the sheet S being conveyed and the edge positions of the sheet S in a width direction that is orthogonal to the conveying direction, and thereby calculates the shape of the sheet S.

The image forming apparatus 101 also includes a fusing unit 50. The fusing unit 50 includes a halogen lamp 57 as a heat source, an endless fusing belt 56, and a pressure roller 52 that is pressed against the fusing belt 56. The fusing unit 50 changes fusing condition parameters according to the type of sheet S. The fusing condition parameters include the temperature of the fusing belt 56 and the pressure roller 52, a nip width between the fusing belt 56 and the pressure roller 52, and the rotational speed of the pressure roller 52. The sheet S onto which an image has been transferred is conveyed by a conveyor belt 41 from the secondary transfer unit 77 to the fusing unit 50.

In the image forming apparatus 101, when image data and an image formation start signal are received, a drive motor (not shown) rotates the roller 61 and thereby causes other rollers and the intermediate transfer belt 15 to rotate. At the same time, the developing units 53 form single-color images on the corresponding photosensitive drums 71. Then, the single-color images formed by the developing units 53 are transferred sequentially onto the rotating intermediate transfer belt 15 so that the single-color images are superposed on each other to form a composite-color image (or multi-color image).

Meanwhile, one of paper-feed rollers 72 of a paper-feed table 76 is selectively rotated to feed the sheet S from one of paper-feed cassettes 73. The sheet S is conveyed by conveying rollers 74 until it touches a pair of registration rollers 75, which is an example of a registration unit (or registration mechanism). The registration rollers 75 correct the posture or orientation of the sheet S being conveyed and rotate to convey the sheet S in synchronization with the timing when the composite-color image on the intermediate transfer belt 15 reaches the secondary transfer unit 77. The composite-color image is transferred from the intermediate transfer belt 15 onto a front surface of the sheet S being conveyed by the secondary transfer unit 77.

After the composite-color image is transferred, the sheet S is conveyed by the conveyor belt 41 into the fusing unit 50 where heat and pressure are applied to fuse the transferred image to the sheet S. When duplex printing is to be performed, the sheet S with the image fused to the front surface is conveyed by a branching claw 91 and flip rollers 92 to a sheet reversing path 93 and a duplex conveying path 94 to form a composite-color image on a back surface of the sheet S.

When the sheet S is to be reversed, the sheet S is guided by the branching claw 91 to the sheet reversing path 93 so that the sheet S is turned upside down. On the other hand, when single-side printing is performed or reversing of the sheet S is not necessary, the sheet S is guided by the branching claw 91 to paper-ejecting rollers 95.

Then, the sheet S is conveyed by the paper-ejecting rollers 95 to a decurling unit 96. The decurling unit 96 can change the degree of decurling (or decurling strength) according to the type of sheet S. The decurling unit 96 adjusts the degree of decurling by changing the pressure applied by decurling rollers 97. After decurling, the sheet S is ejected by the decurling rollers 97. The above mechanism for reversing and ejecting the sheet S may be referred to as a reversing and ejecting unit. A purge tray 40 is provided below the reversing and ejecting unit.

In the exemplary configuration described above, the registration rollers 75 function as a registration mechanism for correcting the position of the sheet S in the conveying direction and in the width direction that is orthogonal to the conveying direction. Alternatively, the registration mechanism may be implemented by a registration gate and a skew correction mechanism. In this case, the sheet conveying unit 100 conveys the sheet S such that the sheet S reaches the secondary transfer unit 77 at substantially the same time as the composite-color image (toner image), on the intermediate transfer belt 15, reaches the secondary transfer unit 77. In the present embodiment, the sheet conveying unit 100 is configured to convey the sheet S at a constant conveying speed. However, the sheet conveying unit 100 may be configured to be able to vary the conveying speed.

The image forming apparatus 101 of the present embodiment is configured such that a composite-color image formed on the intermediate transfer belt 15 is transferred onto the sheet S. Alternatively, the image forming apparatus 101 may be configured such that single-color images formed on the photosensitive drums 71 are directly transferred to and superposed on the sheet S. Also, the disclosure of the present application may be applied to a monochrome image forming apparatus.

<Configuration of Sheet Conveying Unit>

Figure 2:
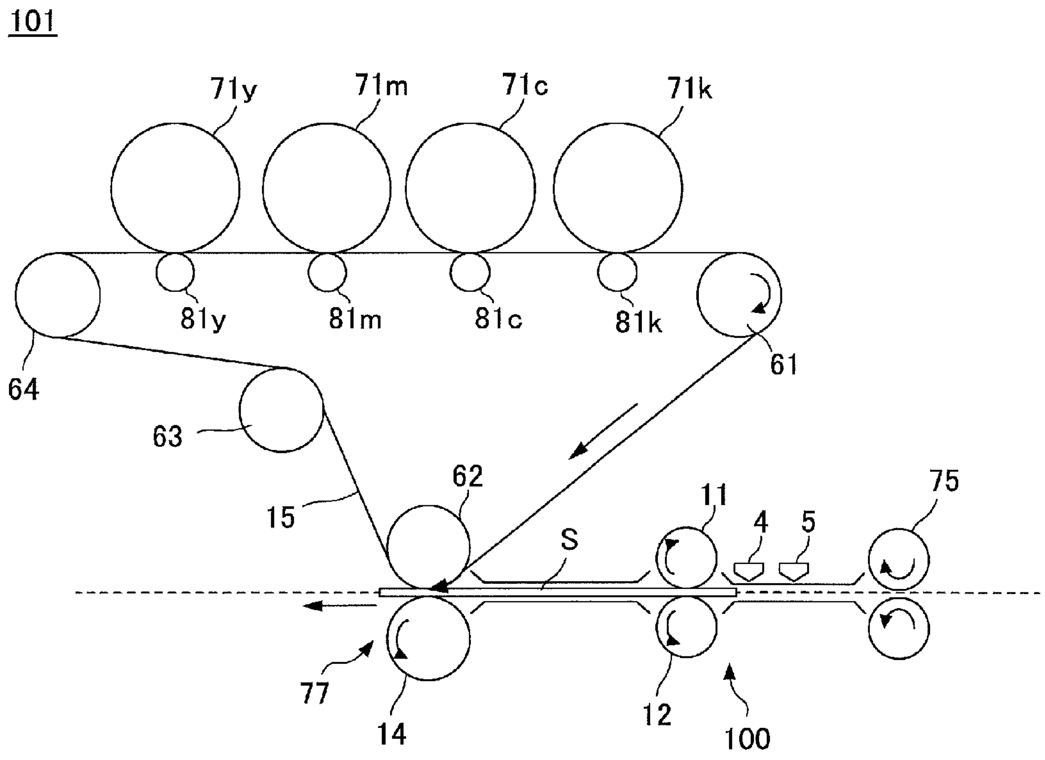
FIG. 2 is a schematic diagram illustrating a part of an image forming apparatus according to the first embodiment.

FIG. 2 is a schematic diagram illustrating a part of the image forming apparatus 101 according to the first embodiment.

As illustrated by FIG. 2, the sheet conveying unit 100 of the image forming apparatus 101 is disposed in a conveying path of the sheet S.

The sheet conveying unit 100 conveys the sheet S to the secondary transfer unit 77, and also detects the length in the conveying direction of the sheet S and the edge positions of the sheet S in the width direction that is orthogonal to the conveying direction to calculate the shape of the sheet S.

The sheet conveying unit 100 may include a driven roller 11 and a drive roller 12 that function as a conveying unit, an edge passage detection sensor 4, and a line sensor 5.

The drive roller 12 is rotated by a driving force generated by a driving unit (not shown) such as a motor. The driven roller 11 is disposed to face the drive roller 12 so that the sheet S is sandwiched between the driven roller 11 and the drive roller 12, and is driven by the rotation of the drive roller 12 or the friction with the sheet S.

The edge passage detection sensor 4 is implemented, for example, by a transmissive or reflective optical sensor and detects the passage of leading and trailing edges of the sheet S in the conveying direction. The line sensor 5 is implemented, for example, by a contact image sensor (CIS) and detects the positions of side edges of the sheet S in the width direction that is orthogonal to the conveying direction. The line sensor 5 is disposed in the conveying path of the sheet S between the registration rollers 75 and the driven and drive rollers 11 and 12.

During duplex printing, the sheet S expands and contracts and thereby deforms when heated and pressed by the fusing unit 50 after an image is formed on its front surface, and continues to deform even after passing through the fusing unit 50 as the temperature decreases. For this reason, to accurately perform magnification correction of an image to be printed on the back surface of the sheet S, it is desirable to measure the shape of the sheet S immediately before the image is transferred onto the back surface of the sheet S. Accordingly, the sheet conveying unit 100 is preferably disposed immediately upstream of the secondary transfer unit 77. Hereafter, printing on the front surface of the sheet S is referred to as "front surface printing" and printing on the back surface of the sheet S is referred to as "back surface printing".

<Functional Configuration of Image Forming Apparatus>

Figure 3:
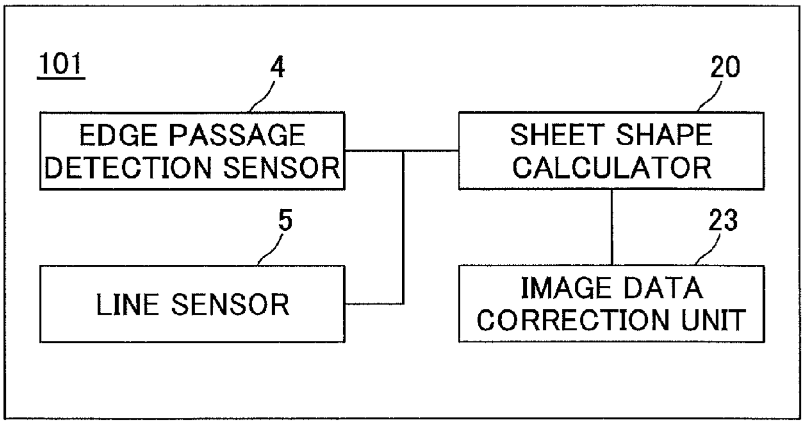
FIG. 3 is a block diagram illustrating an exemplary functional configuration of an image forming apparatus according to the first embodiment.

FIG. 3 is a block diagram illustrating an exemplary functional configuration of the image forming apparatus 101 according to the first embodiment.

As illustrated by FIG. 3, the image forming apparatus 101 may include the edge passage detection sensor 4, the line sensor 5, a sheet shape calculator 20, and an image data correction unit 23.

The sheet shape calculator 20 calculates the shape of the sheet S, according to a method described later, based on detection results of the edge passage detection sensor 4 and the line sensor 5.

The image data correction unit 23 corrects image data to be formed on the sheet S based on the shape of the sheet S calculated by the sheet shape calculator 20.

With the configuration where the image data correction unit 23 corrects image data based on the shape of the sheet S calculated by the sheet shape calculator 20, the image forming apparatus 101 can print images on two sides of the sheet S with accurate registration.

<Sheet Shape Calculation Method>

An exemplary method of calculating the shape of the sheet S performed by the sheet shape calculator 20 is described below with reference to FIGS. 4 through 6.

Figure 4:
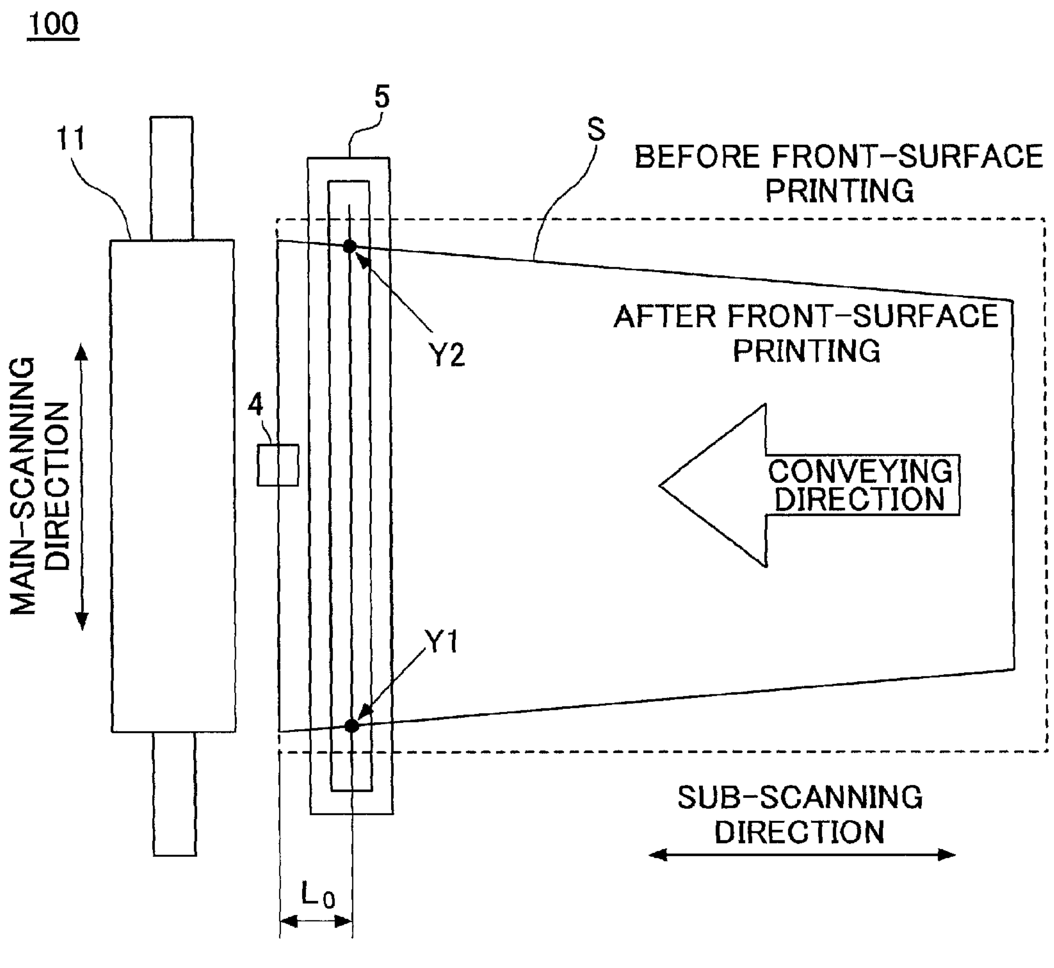
FIG. 4 is a drawing used to describe a sheet shape calculation method according to the first embodiment.
Figure 5:
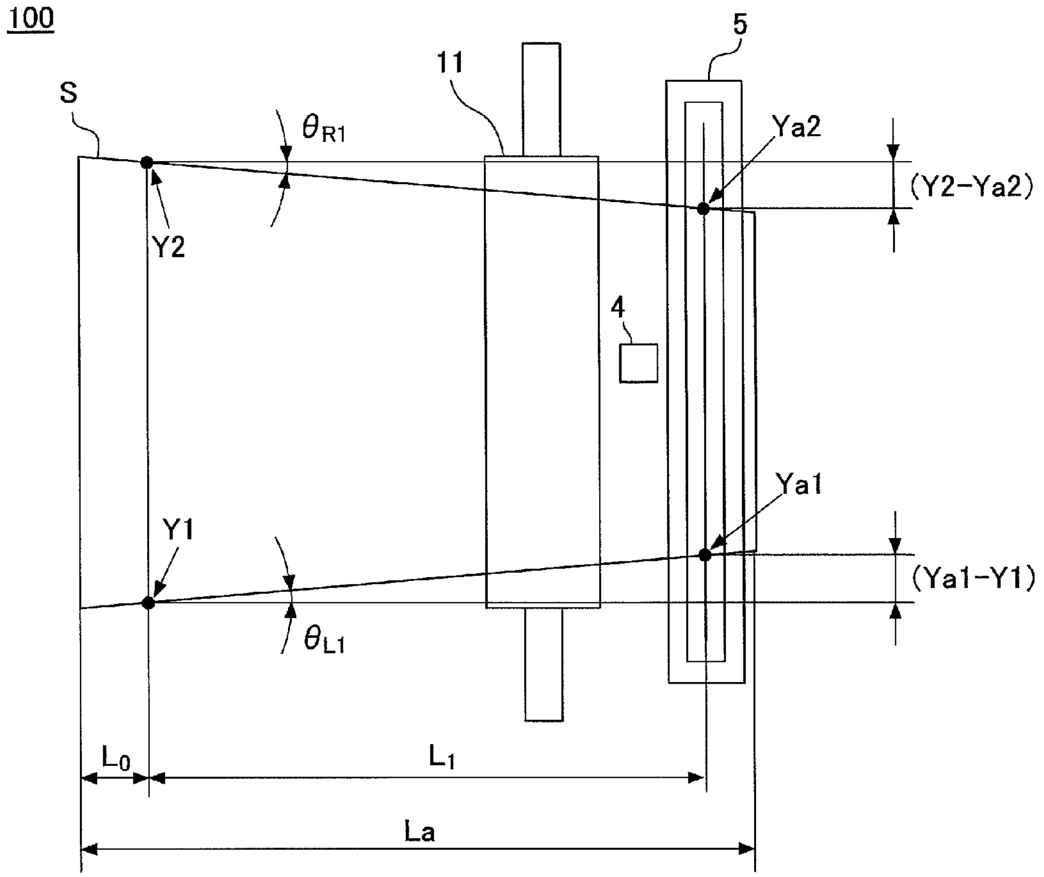
FIG. 5 is another drawing used to describe a sheet shape calculation method according to the first embodiment.

In FIGS. 4 and 5, it is assumed that the sheet S is conveyed by the sheet conveying unit 100 from the right to the left. In FIG. 4, the sheet S before front surface printing is indicated by a dotted line, and the sheet S after front surface printing is indicated by a solid line. As exemplified by FIG. 4, when heated and pressed by the fusing unit 50 during front surface printing, the entire sheet S contracts and the rear part of the sheet S contracts more greatly than the front part of the sheet S. As a result, the shape of the sheet S changes from a rectangle to a trapezoid.

As illustrated by FIGS. 4 and 5, along the conveying path of the sheet S, the line sensor 5, the edge passage detection sensor 4, and the driven and drive rollers 11 and 12 are arranged in this order from the upstream side. Although not shown in FIGS. 4 and 5, the registration rollers 75 are disposed upstream of the line sensor 5. Also, the secondary transfer unit 77 is disposed downstream of the driven and drive rollers 11 and 12. Also in FIGS. 4 through 6, $L_0$ indicates the distance between the edge passage detection sensor 4 and the line sensor 5.

In the present embodiment, the positions of side edges of the sheet S in the width direction are detected by one line sensor 5. Alternatively, multiple sensors may be used to detect the positions of side edges of the sheet S in the width direction.

The registration rollers 75 disposed upstream of the sheet conveying unit 100 correct the conveying posture (or orientation) of the sheet S such that the leading edge of the sheet S becomes substantially orthogonal to the conveying direction, and convey the sheet S in synchronization with the transfer timing (or image formation timing) of the secondary transfer unit 77 disposed downstream of the sheet conveying unit 100.

When the sheet S is conveyed by the registration rollers 75 and the leading edge of the sheet S is detected by the edge passage sensor 4 as illustrated in FIG. 4, the line sensor 5 detects positions Y1 and Y2 of the side edges of the sheet S in the width direction that is orthogonal to the conveying direction. Here, the position Y1 detected by the line sensor 5 is defined as zero (Y1=0) and the direction from the position Y1 toward the position Y2 is defined as a positive direction. Alternatively, an end of the line sensor 5 may be defined as zero and the position Y1 may be represented by a positive value. Accordingly, the descriptions and formulas below may also be applied to a case where the position Y1 is not defined as zero.

Next, as illustrated by FIG. 5, when the sheet S is conveyed by a distance $L_1$ by the driven and drive rollers 11 and 12 after the positions Y1 and Y2 of the side edges of the sheet S in the width direction are detected by the line sensor 5, the line sensor 5 detects again positions Ya1 and Ya2 of the side edges of the sheet S in the width direction. When Ya1>Y1 and Ya2<Y2, this indicates that the degree of contraction of the sheet S gradually increases from the leading edge toward the trailing edge (i.e., in the direction opposite to the conveying direction), and the sheet S is deformed into a trapezoid.

The distance. $L_1$, based on which the side edges of the sheet S are detected, is preferably set at a value that is greater than or equal to two thirds (⅔) of a length La of the sheet S in the conveying direction. That is, the line sensor 5 is preferably configured to detect the positions of the side edges of the sheet S in the width direction at positions in the conveying direction of the sheet S that are as close as possible to the leading edge and the trailing edge.

The sheet shape calculator 20 calculates an angle $\theta_{L1}$ between the conveying direction and a straight line connecting the positions Y1 and Ya1 of the side edges of the sheet S and an angle $\theta_{R1}$ between the conveying direction and a straight line connecting the positions Y2 and Ya2 of the side edges of the sheet S according to formulas (1) and (2) below.

$$\tan \theta_{L1} = (Ya1 - Y1)/L_1 \tag{1}$$

$$\tan \theta_{R1} = (Y2 - Ya2)/L_1 \tag{2}$$

Figure 6:
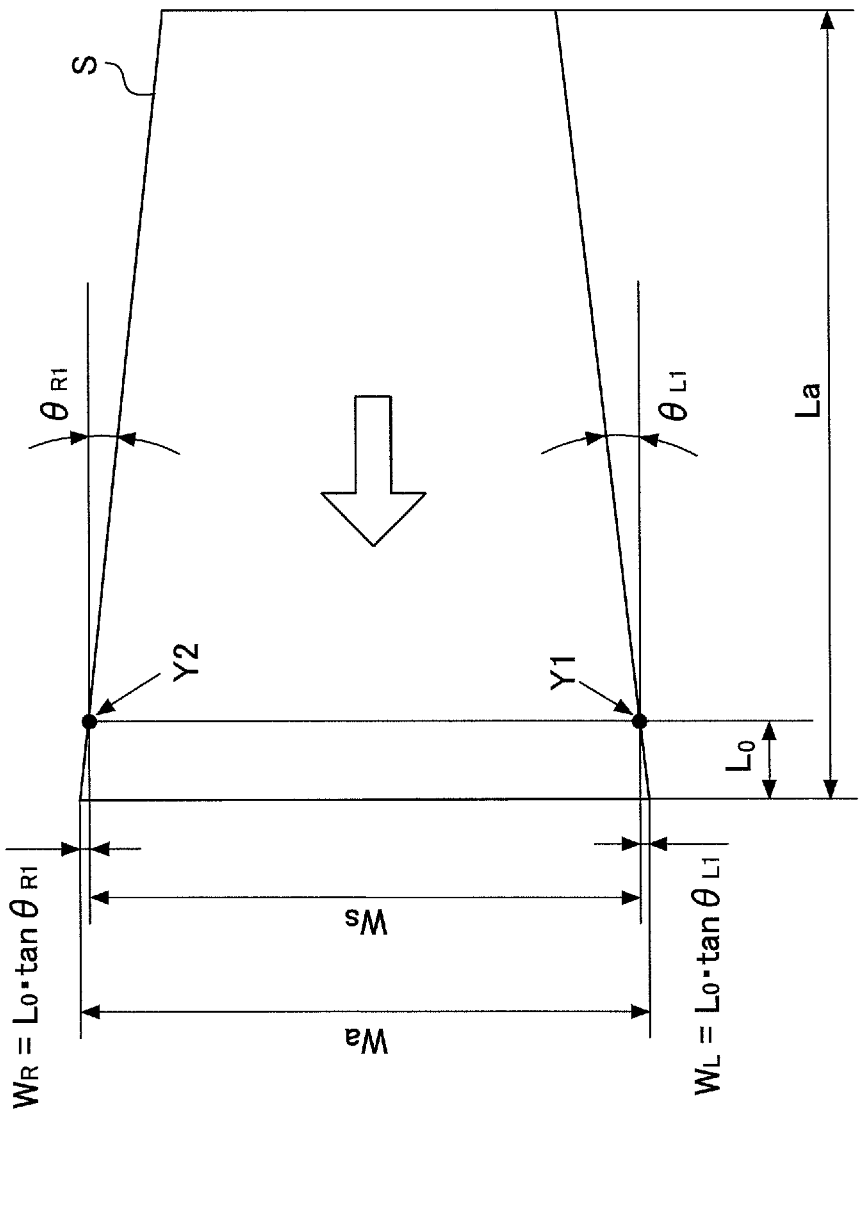
FIG. 6 is another drawing used to describe a sheet shape calculation method according to the first embodiment.

Also, as illustrated by FIG. 6, the sheet shape calculator 20 calculates a length (width) Wa at the leading edge of the sheet S in the width direction that is orthogonal to the conveying direction according to formula (3) below. In formula (3), Ws indicates a width of the sheet S at the distance $L_0$ from the leading edge.

$$\begin{aligned} Wa &= Ws + W_L + W_R \\ &= Ws + (L_0 \cdot \tan\theta_{L1}) + (L_0 \cdot \tan\theta_{R1}) \end{aligned} \tag{3}$$

On the other hand, when the sheet S is deformed such that its width gradually increases from the leading edge toward the trailing edge, the width Wa at the leading edge of the sheet S can be obtained according to formula (4) below.

$$\begin{aligned} Wa &= Ws - W_L - W_R \\ &= Ws - (L_0 \cdot \tan\theta_{L1}) - (L_0 \cdot \tan\theta_{R1}) \end{aligned} \tag{4}$$

After the positions Ya1 and Ya2 of the side edges of the sheet S in the width direction are detected by the line sensor 5, the sheet S is conveyed by the driven and drive rollers 11 and 12 and the trailing edge of the sheet S is detected by the edge passage detection sensor 4. The sheet shape calculator 20 can obtain the length La in the conveying direction of the sheet S based on the time between the detection of the leading edge and the detection of the trailing edge of the sheet S by the edge passage detection sensor 4, and the conveying speed of the sheet S.

As described above, the sheet shape calculator can calculate the angles $\theta_{L1}$ and $\theta_{R1}$ between the conveying direction and the lines connecting the positions Y1 and Ya1 and connecting the positions Y2 and Ya2 of the side edges of the sheet S, the width Wa at the leading edge of the sheet S, and the length La in the conveying direction of the sheet S, and calculate the shape of the sheet S based on the calculated values.

Next, an exemplary process of correcting an image magnification based on the shape of the sheet S calculated by the sheet shape calculator 20 is described. According to the present embodiment, the sheet shape calculator 20 calculates the shape of the sheet S immediately before the sheet S reaches the secondary transfer roller 14 (i.e., at a position immediately upstream of the secondary transfer roller 14 in the conveying direction). Accordingly, the calculated shape of a current sheet S is used to adjust an exposure data size and exposure timing for a next sheet S that follows the current sheet S.

The exposing unit 55 of the image forming apparatus 101 includes a data buffer that is implemented, for example, by a memory and used to buffer input image data; an image data generator for generating image data used to form an image; an image magnification correcting unit for correcting an image magnification in the sheet conveying direction based on sheet size information; a clock generator for generating a writing clock signal; and a light-emitting device that illuminates the photosensitive drum 71 to form an image.

The data buffer buffers input image data sent from a host device such as a controller according to a transfer clock signal.

The image data generator generates image data based on the writing clock signal from the clock generator and pixel insertion/omission information from the image magnification correcting unit, and outputs driving data. In the driving data, a length corresponding to one cycle of the writing clock signal corresponds to one pixel to be formed. The driving data output from the image data generator turns on and off the light emitting device The image magnification correcting unit generates an image magnification switching signal for switching image magnifications based on the shape of the sheet S calculated by the sheet shape calculator 20 of the sheet conveying unit 100.

The clock generator operates at a high frequency that is several times higher than the frequency of the writing clock signal to be able to change clock cycles and to be able to perform image correction such as pulse-width modulation. Basically, the clock generator generates the writing clock signal at a frequency corresponding to the apparatus speed.

The light-emitting device is implemented, for example, by one of or a combination of a semiconductor laser, a semiconductor laser array, and a surface-emitting laser.

As described above, in the image forming apparatus 101, the image data correction unit 23 corrects image data to be printed on the sheet S based on the shape of the sheet S calculated by the sheet shape calculator 20 so that an image is printed according to the shape of the sheet S. Thus, the present embodiment makes it possible to accurately perform magnification correction and improve the registration accuracy for a print image to be printed on the back surface of the sheet S that is deformed as a result of processing performed by the fusing unit 50 after front surface printing. Also, according to the present embodiment, the number of times the line sensor 5 detects the positions of the side edges of the sheet S in the width direction is limited to a minimum value. This in turn makes it possible to reduce the processing load for sheet shape calculations and image data correction.

Second Embodiment

Next, a second embodiment is described with reference to the accompanying drawings. Below, descriptions of components of the image forming apparatus 101 of the second embodiment that are substantially the same as those of the first embodiment are omitted.

In the image forming apparatus 101 of the second embodiment, the line sensor 5 detects the positions of the side edges of the sheet S in the width direction three or more times to calculate a more complex shape of a deformed sheet S.

An exemplary method of calculating the shape of the sheet S by the image forming apparatus 101 of the second embodiment is described below with reference to FIG. 7.

When the sheet S is conveyed by the registration rollers 75 and detected by the edge passage detection sensor 4, the line sensor 5 detects positions Y1 and Y2 of the side edges of the sheet S in the width direction for the first time (or at the first detection position). Here, the position Y1 detected by the line sensor 5 is defined as zero and the direction from the position Y1 toward the position Y2 is defined as a positive direction.

When the sheet S is further conveyed by a distance $L_1$, the line sensor 5 detects positions Ya1 and Ya2 of the side edges of the sheet S in the width direction for the second time (or at the second detection position). Here, the distance $L_1$ is set at a value that is less than or equal to one second (½) of the length in the conveying direction of the sheet S.

Figure 7:
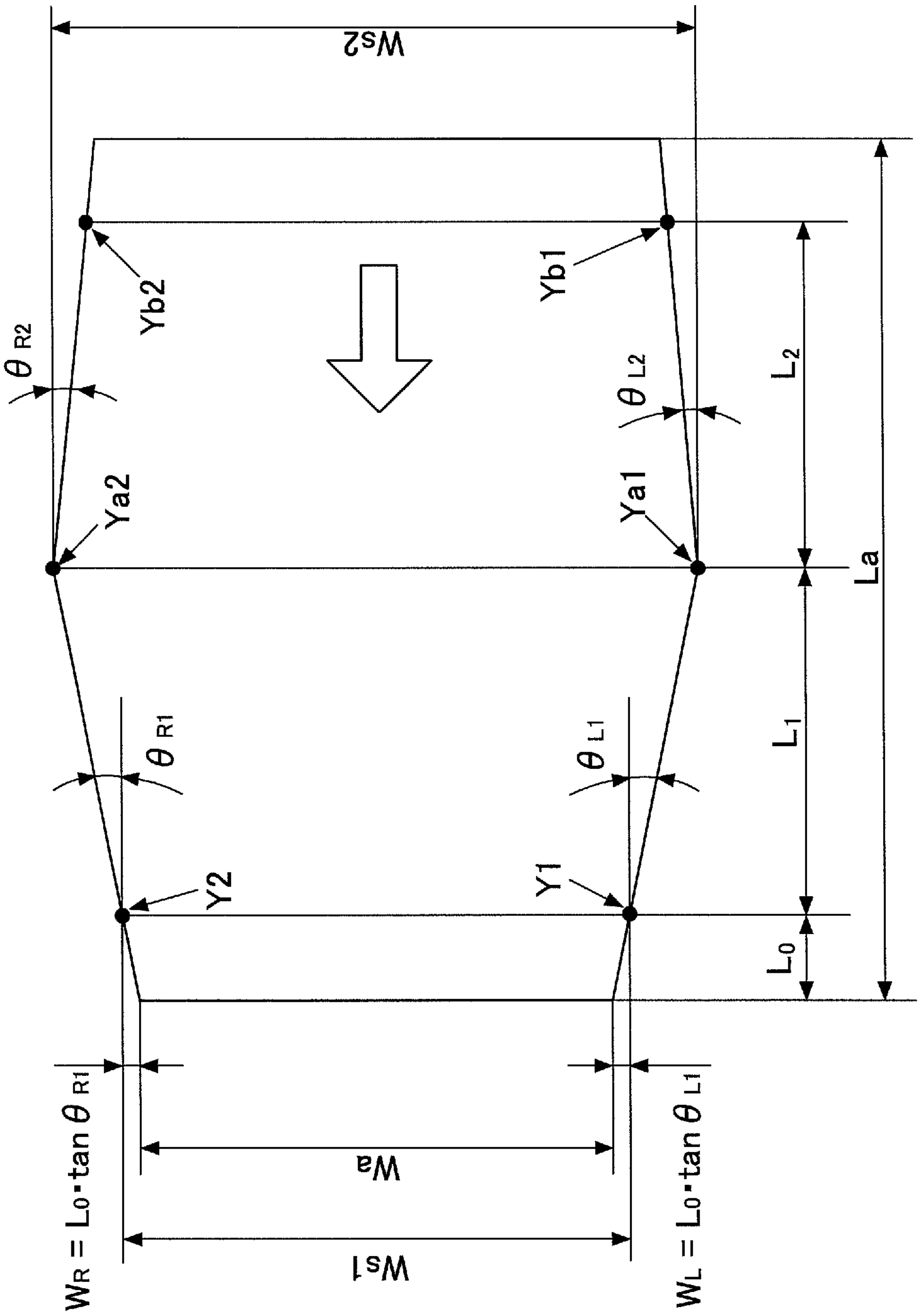
FIG. 7 is a drawing used to describe a sheet shape calculation method according to a second embodiment.

In the example of FIG. 7, Ya1<Y1 and Ya2>Y2. This indicates that the width of the sheet S gradually increases from the leading edge toward a position corresponding to the distance $L_1$ in the conveying direction. The sheet shape calculator 20 calculates angles $\theta_{L1}$ and $\theta_{R1}$ between the conveying direction and lines connecting the positions Y1 and Ya1 and connecting the positions Y2 and Ya2, according to formulas (5) and (6) below.

$$\tan\theta_{L1}=(Y1-Ya1) \quad (5)$$

$$\tan\theta_{R1}=(Ya2-Y2)/L_1 \quad (6)$$

When the sheet S is further conveyed by a distance $L_2$, the line sensor 5 detects positions Yb1 and Yb2 of the side edges of the sheet S in the width direction for the third time (or at the third detection position). In the example of FIG. 7, Yb1>Ya1 and Yb2<Ya2. This indicates that the width of the sheet S gradually decreases from the second detection position toward the third detection position. The sheet shape calculator 20 calculates angles $\theta_{L2}$ and $\theta_{R2}$ between the conveying direction and lines connecting the positions Ya1 and Yb1 and connecting the positions Ya2 and Yb2, according to formulas (7) and (8) below.

$$\tan\theta_{L2}=(Yb1-Ya1)/L_2 \quad (7)$$

$$\tan\theta_{R2}=(Ya2-Yb2)/L_2 \quad (8)$$

The sheet shape calculator 20 also calculates a width Wa at the leading edge of the sheet S according to formula (9) below. In formula (9), Ws1 indicates the width of the sheet S at the distance $L_0$ from the leading edge (i.e., at the first detection position).

$$\begin{aligned} Wa &= Ws1 - W_L - W_R \\ &= Ws1 - (L_0 \cdot \tan\theta_{L1}) - (L_0 \cdot \tan\theta_{R1}) \end{aligned} \quad (9)$$

Also, the sheet shape calculator 20 calculates a width Ws2 of the sheet S at the second detection position (where the positions Ya1 and Ya2 of the side edges of the sheet S are detected) based on a difference between the values of the positions Ya1 and Ya2. Further, the sheet shape calculator 20 can obtain the length La in the conveying direction of the sheet S based on the time between the detection of the leading edge and the detection of the trailing edge of the sheet S by the edge passage detection sensor 4, and the conveying speed of the sheet S.

As described above, the sheet shape calculator 20 can calculate the angles $\theta_{L1}$, $\theta_{L2}$, $\theta_{R1}$, and $\theta_{R2}$ between the conveying direction and lines Y1-Ya1, Ya1-Yb1, Y2-Ya2, and Ya2-Yb2 connecting the positions of the side edges of the sheet S detected by the line sensor 5 at the detection positions, the width Wa at the leading edge of the sheet S, the width Ws2 at the second detection position of the sheet S, and the length La in the conveying direction of the sheet S, and calculate the shape of the sheet S based on the calculated values.

Thus, the image forming apparatus 101 of the second embodiment can calculate the shape of the sheet S even when the sheet S is deformed from a rectangle into a shape other than a trapezoid. Accordingly, even when the sheet S is deformed into a complex shape, the image forming apparatus 101 can print images on two sides of the sheet S with accurate registration according to image data corrected by the image data correction unit 23 based on the shape of the sheet S calculated by the sheet shape calculator 20.

The shape of the sheet S can be more accurately calculated by increasing the number of times the positions of the side edges of the sheet S are detected by the line sensor 5. However, increasing the number of times of detecting the side edge positions increases the processing load and the amount of data necessary for sheet shape calculations and image data correction. Therefore, the number of times of detecting the side edge positions is preferably set at a value that is suitable for the performance of the image forming apparatus 101.

Third Embodiment

Next, a third embodiment is described with reference to the accompanying drawings. Below, descriptions of components of the image forming apparatus 101 of the third embodiment that are substantially the same as those of the above-described embodiments are omitted.

In the image forming apparatus 101 of the third embodiment, the line sensor 5 detects the positions of the side edges of the sheet S in the width direction three or more times, and averages of angles between the conveying direction and lines connecting side edge positions of the sheet S calculated at the respective detection positions (or detection intervals) are obtained. Then, the sheet shape calculator 20 calculates the shape of the sheet S based on the obtained averages of angles. This configuration makes it possible to reduce the processing load and the amount of data necessary for sheet shape calculations and image data correction.

An exemplary method of calculating the shape of the sheet S by the image forming apparatus 101 of the third embodiment is described below.

When the sheet S is conveyed by the registration rollers 75 and detected by the edge passage detection sensor 4, the line sensor 5 detects positions Y1 and Y2 of the side edges of the sheet S in the width direction for the first time (or at the first detection position). Here, the position Y1 detected by the line sensor 5 is defined as zero and the direction from the position Y1 toward the position Y2 is defined as a positive direction.

When the sheet S is further conveyed by a distance $L_1$, the line sensor 5 detects positions Ya1 and Ya2 of the side edges of the sheet S in the width direction for the second time (or at the second detection position). Here, the distance $L_1$ is set at a value that is less than or equal to one half (½) of the length in the conveying direction of the sheet S.

Figure 8:
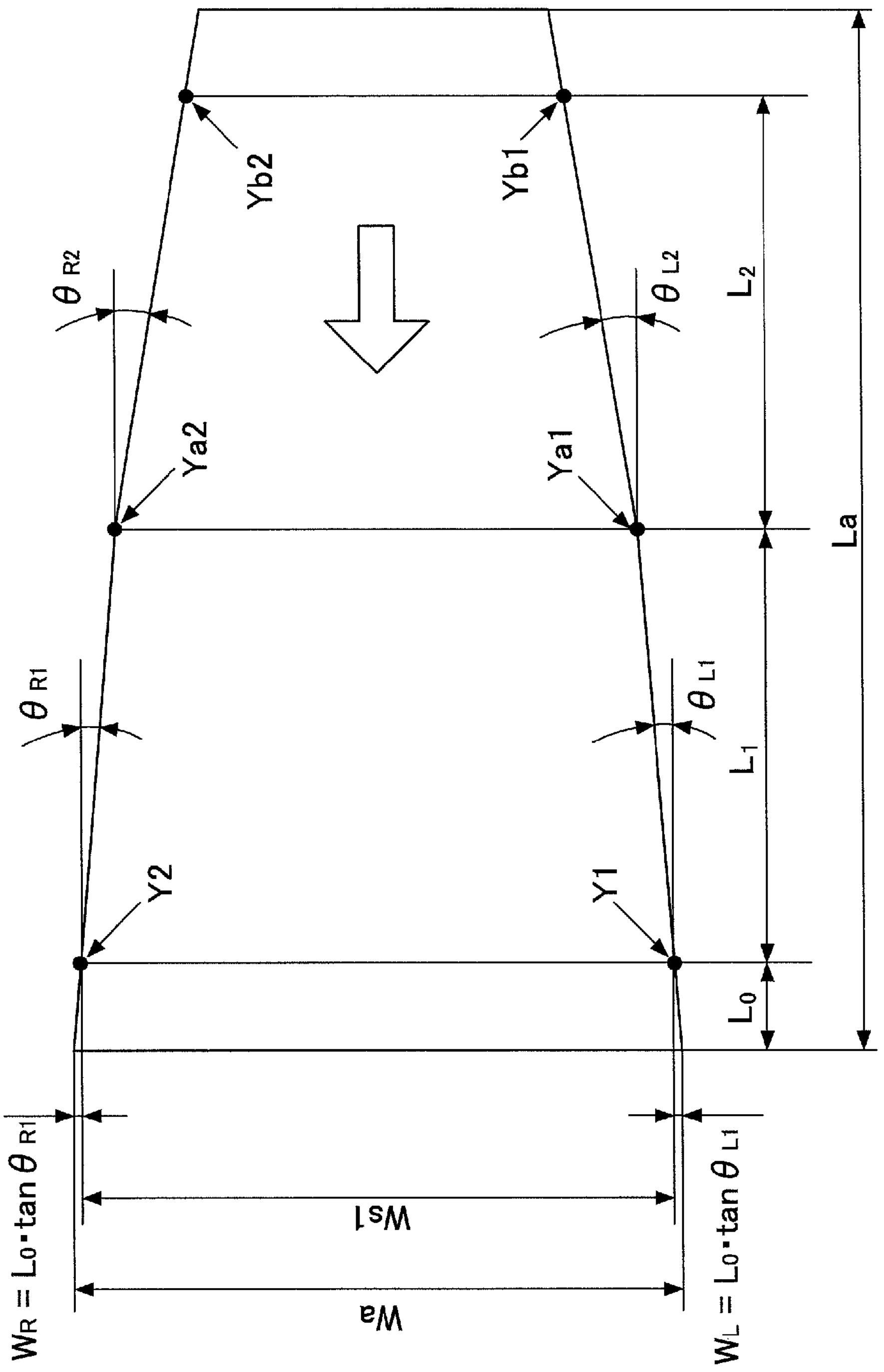
FIG. 8 is a drawing used to describe a sheet shape calculation method according to a third embodiment.

In the example of FIG. 8, Ya1>Y1 and Ya2<Y2. This indicates that the width of the sheet S gradually decreases from the leading edge toward a position corresponding to the distance $L_1$ in the conveying direction. The sheet shape calculator 20 calculates angles $\theta_{L1}$ and $\theta_{R1}$ between the conveying direction and lines connecting the positions Y1 and Ya1 and connecting the positions Y2 and Ya2, according to formulas (10) and (11) below.

$$\tan\theta_{L1}=(Ya1-Y1)/L_1 \quad (10)$$

$$\tan\theta_{R1}=(Y2-Ya2)/L_1 \quad (11)$$

When the sheet S is further conveyed by a distance $L_2$, the line sensor 5 detects positions Yb1 and Yb2 of the side edges of the sheet S in the width direction for the third time (or at the third detection position). In the example of FIG. 8, Yb1>Ya1 and Yb2<Ya2. This indicates that the width of the sheet S also gradually decreases from the second detection position toward the third detection position. The sheet shape calculator 20 calculates angles $\theta_{L2}$ and $\theta_{R2}$ between the conveying direction and lines connecting the positions Ya1 and Yb1 and connecting the positions Ya2 and Yb2, according to formulas (12) and (13) below.

$$\tan\theta_{L2}=(Yb1-Ya1)/L_2 \quad (12)$$

$$\tan\theta_{R2}=(Ya2-Yb2)/L_2 \quad (13)$$

Then, the sheet shape calculator 20 calculates, according to formulas (14) and (15), averages of the angles at the respective sides of the sheet S that are calculated using formulas (10) through (13).

$$\tan\theta_{La}=(\tan\theta_{L1}+\ldots+\tan\theta_{L(n-1)})/(n-1) \quad (14)$$

$$\tan\theta_{Ra}=(\tan\theta_{R1}+\ldots+\tan\theta_{R(n-1)})/(n-1) \quad (15)$$

In formulas (14) and (15), "n" indicates the number of times the positions of the side edges of the sheet S in the width direction are detected by the line sensor 5.

The sheet shape calculator 20 also calculates a width Wa at the leading edge of the sheet S according to formula (16) below. In formula (16), Ws1 indicates the width of the sheet S at the distance $L_0$ from the leading edge (i.e., at the first detection position).

$$\begin{aligned} Wa &= Ws1 + W_L + W_R \quad (16)\\ &= Ws1 + (L_0\cdot\tan\theta_{L1}) + (L_0\cdot\tan\theta_{R1}) \end{aligned}$$

Further, the sheet shape calculator 20 can obtain the length La in the conveying direction of the sheet S based on the time between the detection of the leading edge and the detection of the trailing edge of the sheet S by the edge passage detection sensor 4, and the conveying speed of the sheet S.

As described above, the sheet shape calculator 20 can calculate the averages $\theta_{La}$ and $\theta_{Ra}$ of angles between the conveying direction and the lines connecting the positions of the side edges of the sheet S detected by the line sensor 5 at the respective detection positions, the width Wa at the leading edge of the sheet S, and the length La in the conveying direction of the sheet S, and calculate the shape of the sheet S based on the calculated values.

Thus, the image forming apparatus 101 of the third embodiment can calculate the shape of the sheet S based on the averages of angles between the conveying direction and the lines connecting the positions of the side edges of the sheet S detected by the line sensor 5 at the respective detection positions. Accordingly, the image forming apparatus 101 of the third embodiment can print images on two sides of the sheet S with accurate registration while reducing the processing load and the amount of data necessary for sheet shape calculations by the sheet shape calculator 20 and image data correction by the image data correction unit 23.

Fourth Embodiment

Next, a fourth embodiment is described with reference to the accompanying drawings. Below, descriptions of components of the image forming apparatus 101 of the fourth embodiment that are substantially the same as those of the above-described embodiments are omitted.

According to the fourth embodiment, the image forming apparatus 101 includes sensors for detecting the passage of edges of the sheet S that are disposed upstream and downstream of the driven and drive rollers 11 and 12 in the conveying direction, and an encoder for measuring the amount of rotation of the driven roller 11. This configuration makes it possible to accurately measure a distance (conveyed distance) that the sheet S is conveyed and the length of the sheet S in the conveying direction, and thereby makes it possible to more accurately calculate the shape of the sheet S.

<Configuration of Sheet Conveying Unit>

Figure 9:
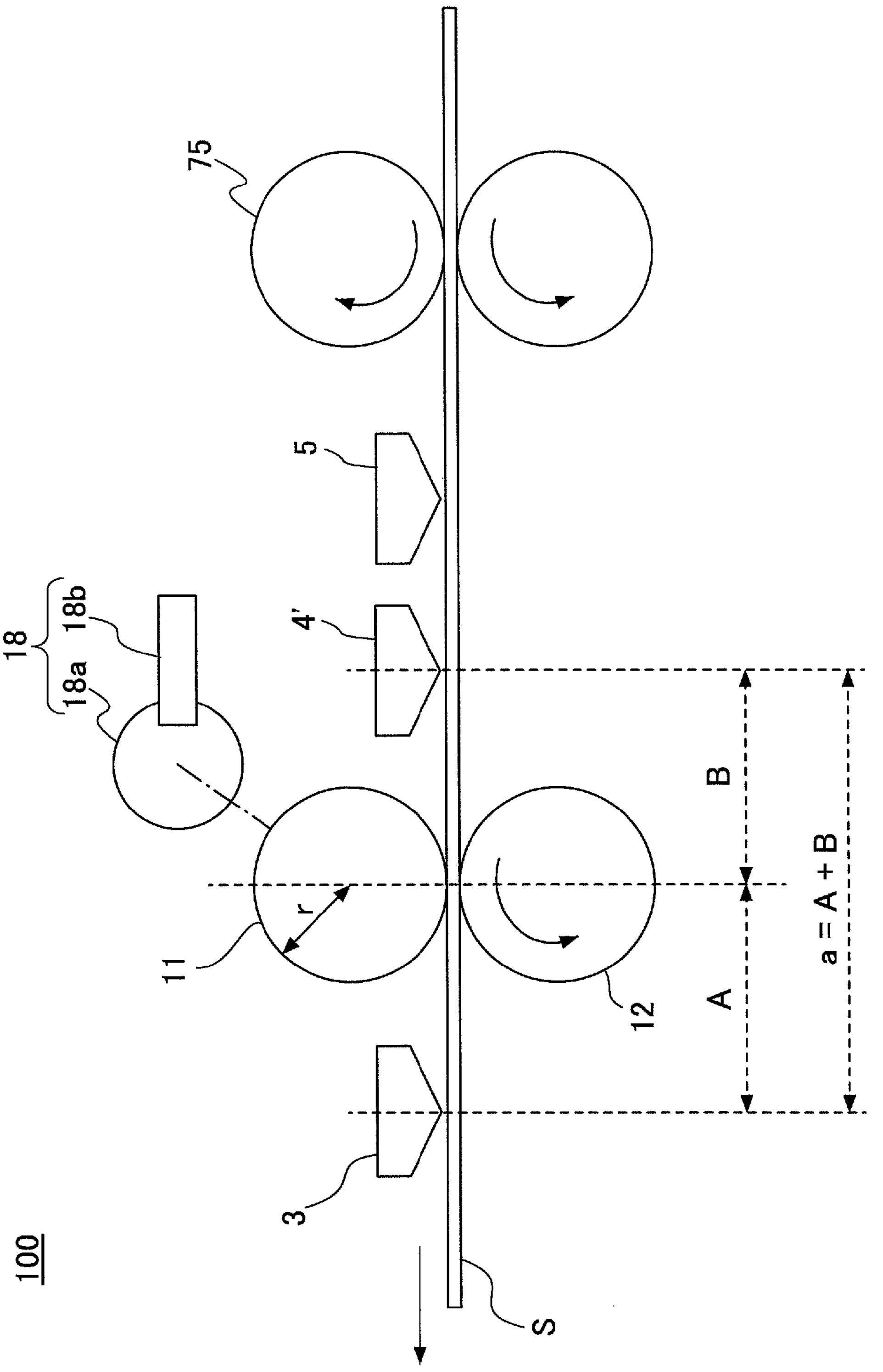
FIG. 9 is a schematic diagram illustrating an exemplary configuration of a sheet conveying unit of an image forming apparatus according to a fourth embodiment.

An exemplary configuration of the sheet conveying unit 100 of the image forming apparatus 101 according to the fourth embodiment is described below with reference to FIGS. 9 and 10. FIG. 9 is a schematic diagram of the sheet conveying unit 100, and FIG. 10 is a top view of the sheet conveying unit 100.

The sheet conveying unit 100 includes the drive roller 12 that is rotated by a driving force generated by a driving unit (not shown) such as a motor and the driven roller 11 disposed to face the drive roller 12 so that the sheet S is sandwiched between the driven roller 11 and the drive roller 12. The driven roller 11 is driven by the rotation of the drive roller 12 or the friction with the sheet S.

The registration rollers 75 are provided upstream of the driven and drive rollers 11 and 12 in the sheet conveying direction. The secondary transfer unit 77 is provided downstream of the driven and drive rollers 11 and 12 in the sheet conveying direction.

Figure 10:
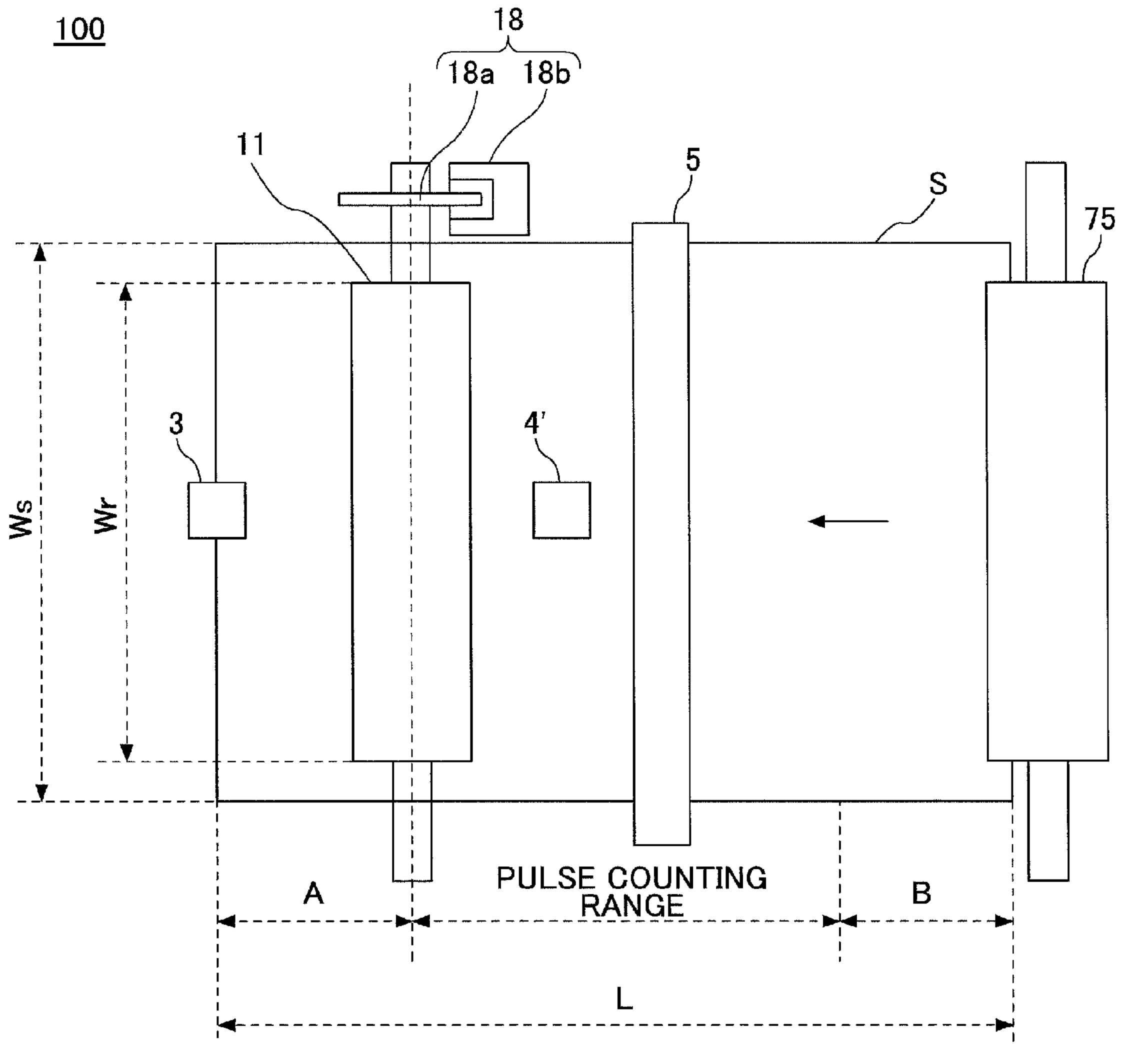
FIG. 10 is a top view of a sheet conveying unit of an image forming apparatus according to the fourth embodiment.

As illustrated in FIG. 10, a length Wr of the driven roller 11 in the width direction that is orthogonal to the sheet conveying direction is less than a minimum width Ws of the sheet S supported by the sheet conveying unit 100. Accordingly, the driven roller 11 does not touch the drive roller 12 when conveying the sheet S and is driven solely by the friction with the sheet S. With this configuration, the driven roller 11 is not influenced by the drive roller 12 when conveying the sheet S and can be used to accurately measure the distance that the sheet S is conveyed.

As illustrated in FIGS. 9 and 10, a rotary encoder 18 is provided on the rotational shaft of the driven roller 11 of the sheet conveying unit 100. The rotary encoder 18 includes an encoder disk 18*a* that rotates along with the rotation of the driven roller 11 and an encoder sensor 18*b* that detects slits formed in the encoder disk 18*a* and generates a pulse signal. A pulse counter 21 (see FIG. 11) used as a conveyed amount measuring unit counts pulses in the pulse signal and thereby measures the amount of rotation of the driven roller 11 that represents the conveyed amount (or length) of the sheet S.

Although the rotary encoder 18 is provided on the rotational shaft of the driven roller 11 according to the present embodiment, the rotary encoder 18 may instead be provided on the rotational shaft of the drive roller 12. Here, the number of rotations of a roller necessary to convey the sheet S a given distance increases and the number of pulses counted to measure the distance increases as the diameter of the roller becomes smaller. Accordingly, to accurately measure a conveyed distance of the sheet S, the diameter of a roller to which the rotary encoder 18 is attached is preferably as small as possible.

Also, the driven roller 11 or the drive roller 12 to which the rotary encoder 18 is attached is preferably made of a metal material to reduce the axis deflection. Reducing the axis deflection makes it possible to accurately measure the conveyed distance of the sheet S.

A start trigger sensor 3 and a stop trigger sensor 4' are provided downstream and upstream of the driven and drive rollers 11 and 12 in the sheet conveying direction. The start trigger sensor 3 and the stop trigger sensor 4' detect the passage of the edges of the sheet S being conveyed. The start trigger sensor 3 and the stop trigger sensor 4' may be implemented, for example, by transmissive or reflective optical sensors that can accurately detect the edges of the sheet S. In the present embodiment, it is assumed that the start trigger sensor 3 and the stop trigger sensor 4' are implemented by reflective optical sensors.

The start trigger sensor 3 is disposed downstream of the driven and drive rollers 11 and 12 in the sheet conveying direction and used as a downstream detector for detecting the passage of the leading edge of the sheet S. The stop trigger sensor 4' is disposed upstream of the driven and drive rollers 11 and 12 in the sheet conveying direction and used as an upstream detector for detecting the passage of the trailing edge of the sheet S.

As illustrated in FIG. 10, the start trigger sensor 3 and the stop trigger sensor 4' are disposed substantially at the same position in the width direction that is orthogonal to the conveying direction of the sheet S. This configuration makes it possible to minimize the influence of the posture or orientation of the sheet S being conveyed (i.e., a skew with respect to the conveying direction) and thereby makes it possible to more accurately measure the conveyed distance of the sheet S.

In the present embodiment, the start trigger sensor 3 and the stop trigger sensor 4' are disposed substantially at the center in the width direction that is orthogonal to the sheet conveying direction. Alternatively, the start trigger sensor 3 and the stop trigger sensor 4' may be disposed at a position that is shifted from the center in the width direction.

The sheet conveying unit 100 also includes the line sensor 5 between the registration rollers 75 and the driven roller 11 in the sheet conveying direction. The line sensor 5 detects the positions of side edges of the sheet S in the width direction.

In FIG. 10, "A" indicates a distance between the start trigger sensor 3 and the driven and drive rollers 11 and 12 in the conveying path of the sheet S, and "B" indicates a distance between the stop trigger sensor 4' and the driven and drive rollers 11 and 12. The distances A and B are preferably set at the smallest possible values to reduce a pulse counting range described later.

The drive roller 12 rotates in a direction indicated by an arrow in FIG. 9. When not conveying the sheet S (i.e., when idling), the driven roller 11 is rotated by the rotation of the drive roller 12. On the other hand, when conveying the sheet S, the driven roller 11 is rotated by the sheet S. When the driven roller 11 is rotated, the rotary encoder 18 provided on the rotational shaft of the driven roller 11 generates a pulse signal.

When the sheet S is conveyed in a direction (sheet conveying direction) indicated by an arrow in FIG. 10 and the passage of the leading edge of the sheet S is detected by the start trigger sensor 3, the pulse counter connected to the rotary encoder 18 starts counting pulses in the pulse signal. When the passage of the trailing edge of the sheet S is detected by the stop trigger sensor 4', the pulse counter 21 stops counting pulses in the pulse signal.

<Functional Configuration of Image Forming Apparatus>

Figure 11:
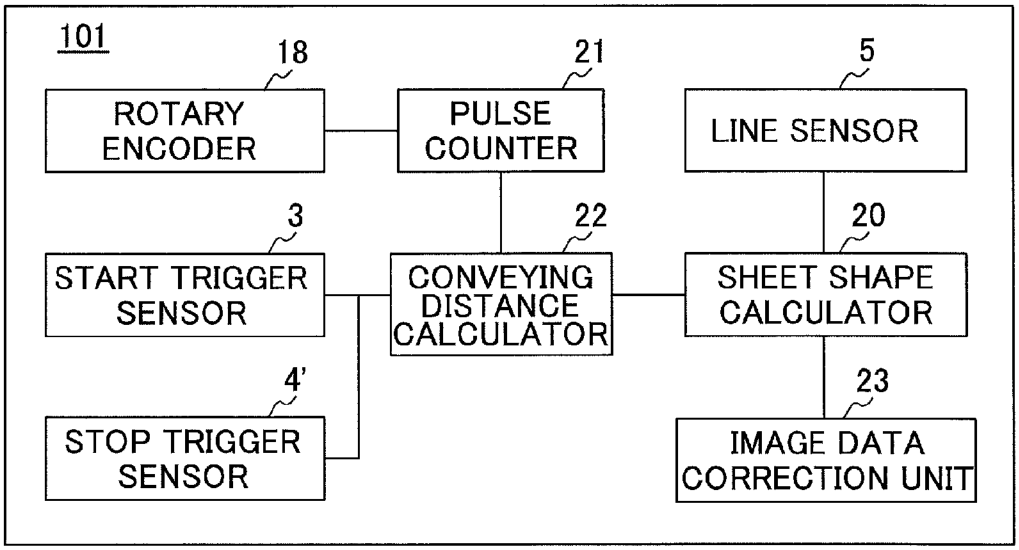
FIG. 11 is a block diagram illustrating an exemplary functional configuration of an image forming apparatus according to the fourth embodiment.

FIG. 11 is a block diagram illustrating an exemplary functional configuration of the image forming apparatus 101 according to the fourth embodiment.

As illustrated by FIG. 11, the image forming apparatus 101 may include the start trigger sensor 3, the stop trigger sensor 4', the line sensor 5, the rotary encoder 18, the sheet shape calculator 20, the pulse counter 21, a conveyed distance calculator 22, and the image data correction unit 23. The driven and drive rollers 11 and 12, the rotary encoder 18, the start trigger sensor 3, the stop trigger sensor 4', and the conveyed distance calculator 22 may be collectively referred to as a length measuring unit.

The sheet shape calculator 20 calculates the shape of the sheet S based on the length in the conveying direction of the sheet S calculated by the conveyed distance calculator 22 and detection results of the line sensor 5. The sheet shape calculator 20 may use any one of the methods described in the first through third embodiments to calculate the shape of the sheet S. In calculating the shape of the sheet S, the sheet shape calculator 20 uses the length in the conveying direction of the sheet S that is calculated by the conveyed distance calculator 22.

The pulse counter 21 counts pulses in the pulse signal generated by the encoder sensor **18*b* by detecting slits formed in the encoder disk 18*a* of the rotary encoder 18 attached to the driven roller 11, and thereby measures the amount of rotation of the driven roller 11** that represents the conveyed amount of the sheet S.

The conveyed distance calculator 22 calculates the conveyed distance and the length in the conveying direction of the sheet S based on results of detecting the sheet S by the start trigger sensor 3 and the stop trigger sensor 4 and the amount of rotation of the driven roller 11 measured by the pulse counter 21.

The image data correction unit 23 corrects image data to be formed on the sheet S based on the shape of the sheet S calculated by the sheet shape calculator 20.

With the configuration where the image data correction unit 23 corrects image data based on the shape of the sheet S calculated by the sheet shape calculator 20, the image forming apparatus 101 can print images on two sides of the sheet S with accurate registration.

<Conveyed Distance Calculation Method>

Next, an exemplary method of calculating the conveyed distance of the sheet S by the image forming apparatus 101 is described.

Figure 12:
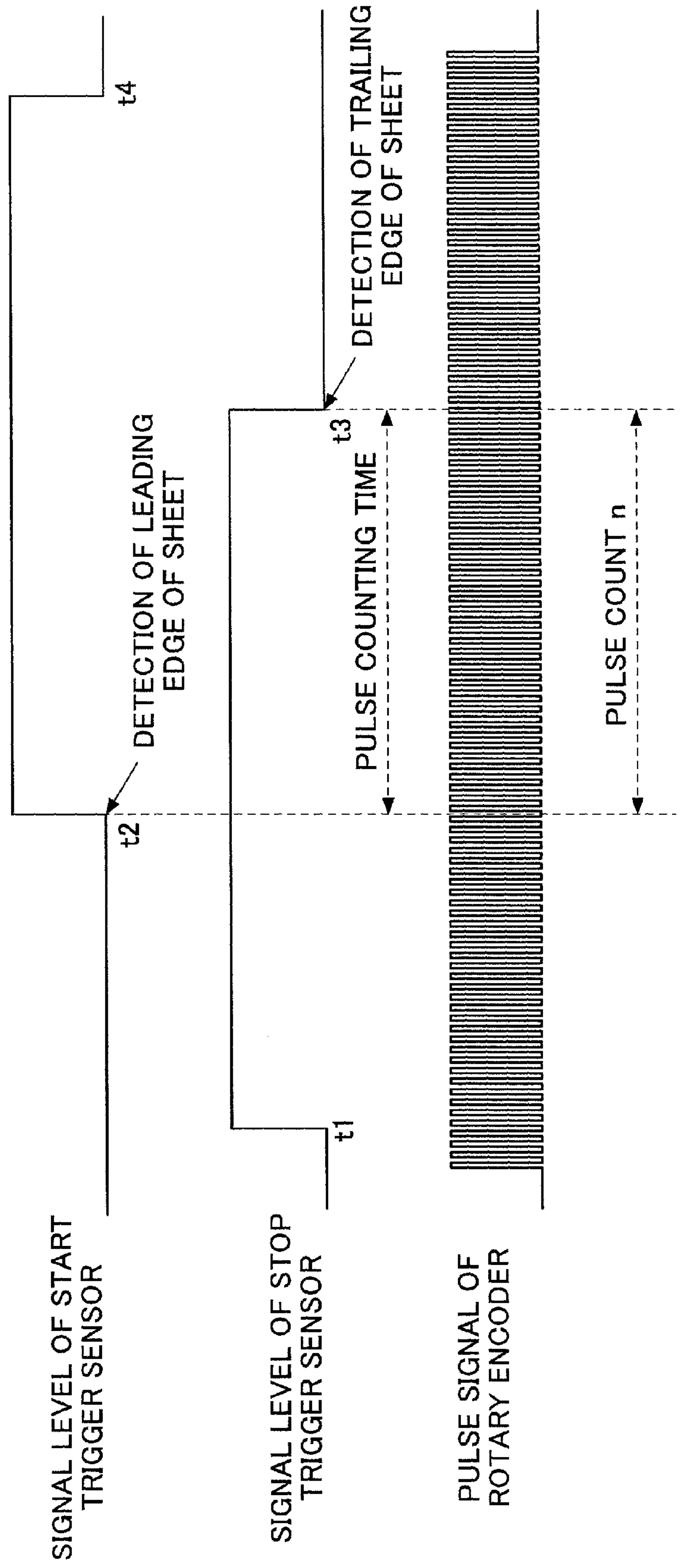
FIG. 12 is a timing chart of exemplary signals output from a start trigger sensor, a stop trigger sensor, and a rotary encoder.

FIG. 12 is a timing chart of exemplary signals output from the start trigger sensor 3, the stop trigger sensor 4, and the rotary encoder 18.

When the driven roller 11 is rotated, the rotary encoder 18 provided on the rotational shaft of the driven roller 11 generates a pulse signal.

In the example of FIG. 12, after the conveyance of the sheet S is started, the stop trigger sensor 4' detects the passage of the leading edge of the sheet S at time t1, and the start trigger sensor 3 detects the passage of the leading edge of the sheet S at time t2.

Then, the stop trigger sensor 4' detects the passage of the trailing edge of the sheet S at time t3, and the start trigger sensor 3 detects the passage of the trailing edge of the sheet S at time t4.

The pulse counter 21 counts pulses in the pulse signal output from the rotary encoder 18 during pulse counting time between time t2 at which the passage of the leading edge of the sheet S is detected by the start trigger sensor 3 and time t3 at which the passage of the trailing edge of the sheet S is detected by the stop trigger sensor 4'.

When "r" indicates the radius of the driven roller 11 to which the rotary encoder 18 is attached, "N" indicates the number of encoder pulses corresponding to one rotation of the driven roller 11, and "n" indicates the number of pulses counted during the pulse counting time, a conveyed distance. L of the sheet S between time t2 and time t3 is obtained by formula (17) below.

$$L=(n/N)\times 2\pi r \tag{17}$$

n: the number of counted pulses

N: the number of encoder pulses corresponding to one rotation of the driven roller 11 [/r]

r: the radius of the driven roller 11 [mm]

Generally, the sheet conveying speed fluctuates depending on the accuracy of the external shape of a roller (particularly, the drive roller 12) for conveying the sheet S, the machine accuracy such as axis deflection accuracy of the roller, the rotational accuracy of, for example, a motor, and the accuracy of a power transmission system including gears and belts. The sheet conveying speed may also fluctuate due to slippage between the drive roller 12 and the sheet S, and a slack in the sheet S caused by a difference in the sheet conveying force or the sheet conveying speed between upstream and downstream conveying units. For these reasons, the pulse cycle or the pulse width of the pulse signal generated by the rotary encoder 18 always fluctuates. However, the number of pulses does not fluctuate.

Accordingly, the conveyed distance calculator 22 of the sheet conveying unit 100 can accurately calculate the conveyed distance L of the sheet S conveyed by the driven and drive rollers 11 and 12 according to formula (17) without relying on the sheet conveying speed.

The conveyed distance calculator 22 can also calculate, for example, a ratio between the conveyed distances of pages of the sheet S and a ratio between the conveyed distances of the sheet S in the front surface printing and the back surface printing (i.e., before and after the fusing process by the fusing unit 50).

For example, the conveyed distance calculator 22 can calculate an expansion/contraction ratio (percentage) R according to formula (18) below based on a ratio of the conveyed distance before a fusing process to the conveyed distance after the fusing process.

$$R=[(n2/N)\times 2\pi r]/[(n1/N)\times 2\pi r] \quad (18)$$

n1: the number of pulses counted when the sheet S is conveyed before the fusing process n2: the number of pulses counted when the sheet S is conveyed after the fusing process For example, when N=2800 [/r] and r=9 [mm] and the number of pulses n1 counted when a sheet S with the A3 size (420×297 mm) is conveyed in the length direction is 18816, the conveyed distance L1 of the sheet S is obtained by the following formula:

$$L1=(18816/2800)\times 2\pi\times 9=380.00 \text{ [mm]}$$

Meanwhile, when the number of pulses n2 counted after the fusing process is performed on the sheet S is 18759, the conveying distance L2 of the sheet S is obtained by the following formula:

$$L2=(18759/2800)\times 2\pi\times 9=378.86 \text{ [mm]}$$

A difference ΔL between the conveyed distance measured before the fusing process and the conveyed distance measured after the fusing process (or between the conveyed distances in the front surface printing and the back surface printing) is $$\Delta L=380.00-378.86=1.14 \text{ [mm]}$$

Also, based on the conveyed distance L1 and the conveyed distance L2, the expansion/contraction ratio R of the sheet S (or the ratio between the lengths of the sheet S in the front surface printing and the back surface printing) can be obtained as follows:

$$R=378.86/380.00=99.70[\%]$$

Thus, in the above example, the length in the conveying direction of the sheet S is reduced by 1 mm due to the fusing process. In this case, if the lengths of images printed on the front and back surfaces of the sheet S are the same, misregistration of about 1 mm occurs. According to the present embodiment, the image data correction unit 23 corrects the length of an image to be printed on the back surface of the sheet S based on the expansion/contraction ratio R to improve the registration accuracy. The image data correction unit 23 at the same time corrects the width of the image to be printed on the back surface of the sheet S based on the width of the sheet S calculated by the sheet shape calculator 20.

In the exemplary method described above, the expansion/contraction ratio R is obtained based on the conveyed distances L1 and L2 of the sheet S measured before and after the fusing process. Alternatively, the image forming apparatus 101 may include an expansion/contraction ratio calculation unit that calculates an expansion/contraction ratio R represented by a ratio between the number of pulses n1 and the number of pulses n2 that are counted when conveying the sheet S before and after the fusing process.

For example, when the number of pulses n1 is 18816 and the number of pulses n2 is 18759, the expansion/contraction ratio R is obtained as follows:

$$R=n2/n1=18759/18816=99.70[\%]$$

Here, a length L in the conveying direction of the sheet S can be obtained by adding a distance "a" between the start trigger sensor 3 and the stop trigger sensor 4' illustrated in FIG. 9 to the conveyed distance L obtained by formula (17).

$$L=(n/N)\times 2\pi r+a \quad (19)$$

a: the distance between the start trigger sensor 3 and the stop trigger sensor 4'

Thus, the conveyed distance calculator 22 of the sheet conveying unit 100 can calculate the length in the conveying direction of the sheet S according to formula (19), i.e., by adding the distance "a" between the start trigger sensor 3 and the stop trigger sensor 4' to the conveyed distance L obtained by formula (17).

Also, the conveyed distance calculator 22 can calculate an expansion/contraction ratio R according to formula (20) below based on a ratio of the length L in the conveying direction of the sheet S before a fusing process in the electrophotography to the length L in the conveying direction of the sheet S after the fusing process.

$$R=[(n2/N)\times 2\pi r+a]/[(n1/N)\times 2\pi r+a] \quad (20)$$

Thus, the conveyed distance calculator 22 of the sheet conveying unit 100 can accurately calculate the lengths L in the conveying direction of the sheet S and calculate the expansion/contraction ratio R based on the lengths L.

As described above, the image forming apparatus 101 of the fourth embodiment includes the conveyed distance calculator 22 that can accurately calculate the conveyed distance and the length in the conveying direction of the sheet S. With this configuration, the sheet shape calculator 20 can more accurately calculate the shape of the sheet S based on the length in the conveying direction of the sheet S calculated by the conveyed distance calculator 22. Accordingly, when performing duplex printing, the image forming apparatus 101 can perform magnification correction on image data according to the calculated shape of the sheet S and improve the registration accuracy.

An image forming apparatus according to preferred embodiments of the present invention are described above. However, the present invention is not limited to the specifically disclosed embodiments, and variations and modifications may be made without departing from the scope of the present invention.

An aspect of this disclosure provides an image forming apparatus that can accurately calculate the shape of a recording medium and improve the registration accuracy of images printed on the front and back surfaces of the recording medium.

What is claimed is:

1. An image forming apparatus, comprising:

an image forming unit that forms an image on a recording medium;

a width detector that detects positions of points on side edges of the recording medium in a width direction that is orthogonal to a conveying direction in which the recording medium is conveyed, wherein the width detector detects the positions of the points on the side edges of the recording medium at multiple detection positions along the conveying direction;

a length measuring unit that measures a length in the conveying direction of the recording medium;

a shape calculator that calculates angles between the conveying direction and straight lines each of which connects the positions of the points on a same side edge detected at the multiple detection positions, calculates a width of a leading edge of the recording medium based on the positions of the points on the side edges and the angles, and calculates a shape of the recording medium based on the angles, the length of the recording medium, and the width of the leading edge of the recording medium; and a correction unit that corrects image data of the image to be formed by the image forming unit based on the calculated shape of the recording medium, wherein the length measuring unit includes a conveying unit that conveys the recording medium, a conveyed amount measuring unit that measures a conveyed amount of the recording medium conveyed by the conveying unit, a downstream detector that is disposed downstream of the conveying unit in the conveying direction and detects the recording medium, an upstream detector that is disposed upstream of the conveying unit and detects the recording medium, and a conveyed distance calculator that calculates a conveyed distance of the recording medium based on detection results of the conveyed amount measuring unit, the downstream detector, and the upstream detector.

2. The image forming apparatus as claimed in claim 1, wherein the width detector detects the positions of the points on the side edges of the recording medium at three or more detection positions; and the shape calculator calculates the angles for the respective straight lines connecting the positions of the points on the side edges detected at the three or more detection positions.

3. The image forming apparatus as claimed in claim 2, wherein the shape calculator calculates the shape of the recording medium based on averages of the angles calculated for the respective straight lines.

4. The image forming apparatus as claimed in claim 1, wherein the correction unit corrects the image data of the image to be formed by the image forming unit on a next recording medium that follows the recording medium, based on the calculated shape of the recording medium.

5. The image forming apparatus as claimed in claim 1, further comprising:

a registration unit that corrects an orientation of the recording medium being conveyed and conveys the recording medium in synchronization with image formation timing of the image forming unit, wherein the width detector is disposed between the registration unit and the image forming unit in a conveying path of the recording medium.

6. The image forming apparatus as claimed in claim 1, wherein the conveyed distance calculator calculates the conveyed distance of the recording medium based on the conveyed amount measured by the conveyed amount measuring unit between a time when the recording medium is detected by the downstream detector and a time when the recording medium is detected by the upstream detector.

7. The image forming apparatus as claimed in claim 1, wherein the conveying unit includes a drive roller that rotates to convey the recording medium, and a driven roller that is disposed to face the drive roller so that the recording medium is sandwiched between the drive roller and the driven roller and is driven by rotation of the drive roller.

* * * * *